(12) United States Patent
Podhola

(10) Patent No.: US 11,946,441 B2
(45) Date of Patent: Apr. 2, 2024

(54) OUTER TURBINE SYSTEM

(71) Applicant: Kamil Podhola, Liberec (CZ)

(72) Inventor: Kamil Podhola, Liberec (CZ)

( * ) Notice: Subject to any disclaimer, the term of this patent is extended or adjusted under 35 U.S.C. 154(b) by 49 days.

(21) Appl. No.: 17/668,401

(22) Filed: Feb. 10, 2022

(65) Prior Publication Data

US 2023/0250791 A1 Aug. 10, 2023

(51) Int. Cl.
*F03B 13/10* (2006.01)
*F03B 3/04* (2006.01)
*F03B 3/06* (2006.01)
*F03B 3/12* (2006.01)
*F03B 3/14* (2006.01)

(52) U.S. Cl.
CPC .............. *F03B 13/10* (2013.01); *F03B 3/04* (2013.01); *F03B 3/06* (2013.01); *F03B 3/12* (2013.01); *F03B 3/126* (2013.01); *F03B 3/14* (2013.01); *F05D 2240/24* (2013.01)

(58) Field of Classification Search
CPC .. F03B 13/10; F03B 3/12; F03B 3/126; F03B 3/14; F05D 2240/24
USPC ............. 416/97 R, 97 A, 185, 186 R, 186 A; 415/203–206, 219.1, 220
See application file for complete search history.

(56) References Cited

U.S. PATENT DOCUMENTS

| | | | |
|---|---|---|---|
| 1,762,124 A * | 6/1930 | Moody | F03B 3/14 415/129 |
| 2,188,741 A * | 1/1940 | Roberts | F24F 7/065 415/206 |
| 2,345,752 A * | 4/1944 | Jandasek | F16D 67/00 475/55 |
| 2,509,442 A * | 5/1950 | Matheisel | B63H 1/16 310/67 R |
| 4,272,685 A * | 6/1981 | Toyama | F03B 13/06 415/124.2 |
| 4,648,788 A * | 3/1987 | Jochum | F04D 29/181 415/91 |
| 5,743,712 A * | 4/1998 | Aylor | F03D 13/20 416/169 R |
| 6,016,600 A * | 1/2000 | Kennell | B23P 6/002 29/889.1 |
| 6,168,373 B1 * | 1/2001 | Vauthier | F03B 13/10 415/908 |
| 6,241,469 B1 * | 6/2001 | Beeck | F01D 5/183 415/115 |
| 9,464,619 B2 * | 10/2016 | Allouche | F03B 3/04 |

(Continued)

*Primary Examiner* — Hoang M Nguyen

(57) ABSTRACT

The invention relates to an outer turbine system (OTS) comprising an outer envelope having first and second ends with an axial inflow and a radial and/or axial outflow of a working gas or liquid. Inner turbine blades are disposed at an inner side of the envelope to rotate the turbine. The envelope and the blades can have a defined shape. The blades can be detachably attachable, adjustable, comprise hollow spaces. The envelope can comprise (adjustable) through openings. The turbine can be mounted in a housing, can include a defined feed casing and one or more stages. The turbine can be supported at defined portions, can be variably mounted, can work bidirectionally, can use regenerative power, can pump and can be fabricated from a defined material. The blades can be provided with a defined cooling system. The turbine can be coupled with another turbine, a mechanocomponent and/or an electrocomponent.

18 Claims, 1 Drawing Sheet

(56) References Cited

U.S. PATENT DOCUMENTS

| | | | |
|---|---|---|---|
| 10,587,169 B2* | 3/2020 | Gruetzner | H02K 1/32 |
| 2005/0214115 A1* | 9/2005 | Keck | F03B 3/125 |
| | | | 415/206 |
| 2006/0280602 A1* | 12/2006 | Chen | F04D 29/281 |
| | | | 415/206 |
| 2008/0232957 A1* | 9/2008 | Presz | F03D 1/04 |
| | | | 415/220 |
| 2010/0026009 A1* | 2/2010 | Sarwin | F03D 9/11 |
| | | | 290/55 |
| 2011/0012363 A1* | 1/2011 | Finnell | F03D 1/0608 |
| | | | 290/55 |
| 2013/0088014 A1* | 4/2013 | Holstein | F03B 3/18 |
| | | | 290/54 |
| 2013/0266446 A1* | 10/2013 | Presz, Jr. | F03D 1/04 |
| | | | 416/189 |
| 2015/0204337 A1* | 7/2015 | Pihet | F04D 29/4226 |
| | | | 415/206 |
| 2020/0263568 A1* | 8/2020 | Copeland | F01D 9/026 |

* cited by examiner

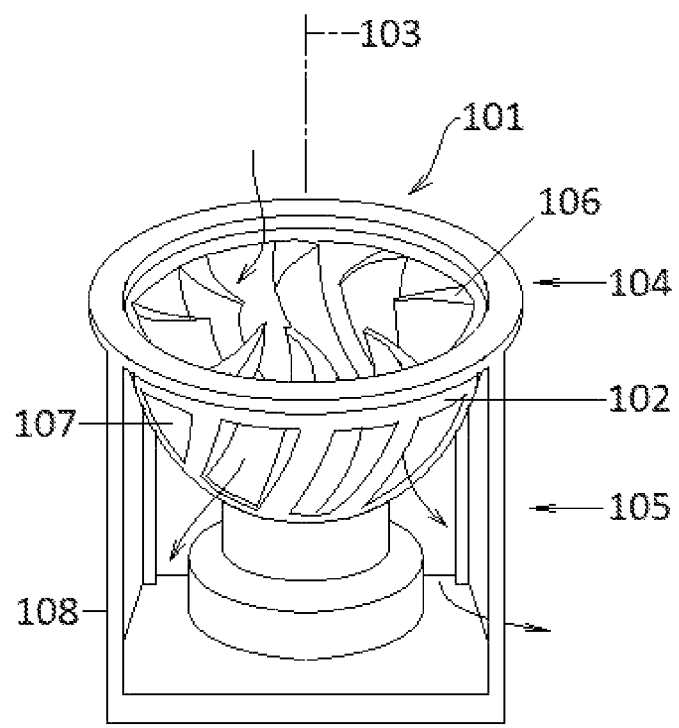

OUTER TURBINE SYSTEM

TECHNICAL FIELD

The invention relates to a turbine system.

Background Art

Hydro turbines can be found in many configurations, shapes and sizes, ranging from the relatively simple to the most sophisticated used in hydro power plants utilizing computerized control with combination of multiple turbines. Common types of hydro turbines are Francis turbine, Kaplan turbine, Pelton turbine, Banki turbine and Turgo turbine. These to bines operate by converting energy from the liquid into mechanical energy then to electrical energy. Differences are present in the configuration of the known hydro turbines especially with regard to water entry or exit direction, runner utilization, impact of centrifugal force on water flow and obstruction to the water flow.

Disclosure of Invention

The object of the present invention is to propose an outer turbine comprising an outer envelope with first and second ends where a gas or liquid axially inflow at the first end and radially and/or axially outflow at the second end, the turbine having inner turbine blades disposed at an inner side of the outer envelope.

It is another object of the present invention to provide the turbine with the blades and/or the outer envelope having defined shapes.

It is still further object to provide the turbine with detachably attachable blades.

It is another object to provide the turbine with adjustable blades.

It is still another object to provide the turbine with blades having hollow spaces.

It is yet another object to provide the turbine with the envelope having (adjustable) through openings.

It is yet another object to provide the turbine mounted in a crossflow enabling housing.

It is still another object to provide the turbine including a defined feed casing.

It is yet another object to provide the turbine supported at defined parts.

It is yet another object to provide the turbine mounted to enable axis of rotation positioning.

It is yet another object to provide the turbine enabling bidirectional flow.

It is yet another object to provide the turbine arranged to pump liquid or gas.

It is still another object to provide the turbine with the blades fabricated from defined materials.

It is still another object to provide the turbine with the blades provided with a defined cooling system.

It is still another object to provide the turbine coupled with another defined turbine.

It is still another object to provide the turbine coupled with a defined mechanocomponent.

And it is still another object to provide the turbine coupled with a defined electrocomponent.

In a first aspect, the invention discloses an outer turbine, characterised in that it comprises: an outer envelope having an axis of rotation at least substantially identical with a rotational axis of said outer turbine, said outer envelope having a first end and a second end, wherein a gas and/or a liquid axially inflow at said first end and radially and/or axially outflow at said second end; one or more inner turbine blades disposed at an inner side of said outer envelope to rotate said outer turbine when said liquid and/or said gas flow through said outer turbine.

BRIEF DESCRIPTION OF DRAWINGS

The invention will now be described by way of example. Only essential elements of the invention are schematically shown and not to scale nor in proportions to facilitate immediate understanding, emphasis being placed upon illustrating the principles of the invention.

FIG. 1 is a schematic perspective view of an outer turbine according to the present invention.

BEST MODE FOR CARRYING OUT THE INVENTION

The following detailed description shows the best contemplated modes of exemplary embodiments. The description is made for the purpose of illustrating the general principles of the invention, and in such a detail that a skilled person in the art can recognise the advantages of the invention, and can be able to make and use the invention. The objects and advantages of this invention may be realized and obtained as pointed out in the appended claims. Additional advantages may be learned by practice of the invention. The detailed description is not intended to limit the principle of the presented invention, but only to show the possibilities of it and to explain the meaning and the sense of the terms used in the appended claims. The description and the detailed description are exemplary and explanatory only.

The terms used in the claims and the specifications shall refer to their synonyms as well.

As used in the claims and the specification, the singular forms are intended to include the plural forms as well and vice versa.

The term "to couple" and derivatives shall refer to a direct or indirect connection via another device and/or connection, such a connection can be mechanical, hydraulical, electrical, electronical, electromagnetical, pneumatical, communication, functional, etc. The connection can be temporary, permanent, detachably attachable, scallable, slotable. Any additional systems may be coupled to the elements, components, etc. and to the system of the invention. The terms "to comprise", "to include", "to contain", "to provide" and derivatives specify the presence of an element, but do not preclude the presence or addition of one or more other elements or groups and combinations thereof.

The term "consisting of" characterises a Markush group which is by nature closed. Single members of the group are alternatively useable for the purpose of the invention. Therefore, a singular if used in the Markush group would indicate only one member of the group to be used. For that reason are the countable members listed in the plural. That means together with qualifying language after the group "or combinations thereof" that only one member of the Markush group can be chosen or any combination of the listed members in any numbers. In other words, although elements in the Markush groups may be described in the plural, the singular is contemplated as well. Furthermore, the phrase "at least one" preceding the Markush groups is to be interpreted that the group does not exclude one or more additional elements preceded by the phrase.

The invention will be described in reference to the accompanying drawings.

FIG. 1 is a central perspective view of an outer turbine (101) comprising an outer envelope (102) having an axis of rotation (103) at least substantially identical with a rotational axis of the turbine (101). The envelope (102) can have a first end (104) and a second end (105). A liquid (gas) can axially inflow at the first end (104) and radially and axially outflow at the second end (105) to rotate the turbine (101). The envelope (102) can have a concave shape (as shown) [or various different shapes as claimed; the same is valid for the blades (106)]. The blades (106) can be detachably attachable (not shown), adjustable (not shown), comprise hollow spaces (not shown). The envelope (102) can comprise through openings (107) [which can be adjustable (not shown)]. The turbine (101) can be mounted into a housing (108) enabling a crossflow (as shown). The turbine (101) can include a feed casing (not shown) as defined in the claims. The turbine (101) can include one or more stages (not shown). The turbine (101) can be supported at the first end (104) and the second end (105) (as shown). The turbine (101) can be variably mounted to be able to change a position of the axis of rotation (103) (not shown). The liquid or gas can flow bidirectionally (not shown), the turbine (101) can be arranged to use regenerative power [e.g. to change an electric energy into a kinetic energy], to pump the liquid or gas [e.g. can be coupled with a motor] (not shown). The turbine (101) can be fabricated of a claimed material and the blades (106) can be provided with a cooling system [as known in the art]. The turbine (101) can be coupled with another turbine (not shown) of a defined type. The turbine can be coupled with claimed defined mechano- and/or electrocomponents in various mechanic systems and electric (electronic) circuits (not shown).

No limitations are intended others than as described in the claims. The present invention is not limited to the described exemplary embodiments. It should be noted that various modifications of the outer turbine can be made without departing from the scope of the invention as defined by the claims.

Elements, integers or components having known equivalents thereof are herein incorporated as if individually set forth.

The material components, materials, chemical substances and compounds, etc., described in this specification reflect the state of knowledge at the time of the filling of this application and may be developed in the future.

INDUSTRIAL APPLICABILITY

The present invention can be used for a large number of applications to exchange kinetic energy with a working fluid or gaz mainly to produce electric energy. The invention propose a turbine with centripetal blades and a smooth outer circumferential surface, a turbine with presumed high efficiency, a turbine with relatively small diameter for small applications. The turbine can be coupled with power plants, vehicles, vessels, models, toys, etc.

I claim:

1. An outer turbine, comprising: an outer envelope having an axis of rotation at least substantially identical with a rotational axis of said outer turbine, said outer envelope having a first end and a second end, wherein said outer envelope comprises at least partially one or more through openings: wherein one or more inner turbine blades are disposed at an inner side of said outer envelope to rotate said outer turbine when a liquid and/or a gas flow through said outer turbine; said outer turbine characterized in that said gas and/or said liquid axially inflow at said first end of said outer turbine and radially and/or axially outflow at said second end of said outer turbine.

2. The outer turbine according to claim 1, wherein said inner turbine blades and/or said outer envelope have a shape, wherein at least one said shape is selected from the group consisting of quadric shapes, concave shapes, convex shapes, symmetrical shapes, free modelled shapes, or combinations thereof.

3. The outer turbine according to claim 1, wherein said one or more inner turbine blades are detachably attachable.

4. The outer turbine according to claim 1, wherein said one or more inner turbine blades are adjustable.

5. The outer turbine according to claim 1, wherein said one or more inner turbine blades comprise at least partially one or more hollow spaces.

6. The outer turbine according to claim 1, wherein said outer envelope comprises at least substantially one or more through openings.

7. The outer turbine according to claim 1, wherein said outer envelope comprises at least partially one or more adjustable through openings.

8. The outer turbine according to claim 1, wherein said outer turbine is rotatably mounted, and/or wherein said outer turbine is mounted in a housing, wherein said housing enables a crossflow of said liquid and/or said gas.

9. The outer turbine according to claim 1, wherein said outer turbine includes a feed casing, wherein at least one said feed casing is selected from the group consisting of spiral casings, direct casings, 3D defined casings, narrowing casings, movable casings, regulable casings, closable casings, casings coupled with valves, casings with fixed blades, at least partially radial casings, at least partially axial casings, or combinations thereof.

10. The outer turbine according to claim 1, wherein said outer turbine includes one or more stages.

11. The outer turbine according to claim 1, wherein said outer turbine is supported at least at said first end and/or at said second end and/or between said first end and said second end.

12. The outer turbine according to claim 1, wherein said liquid and/or said gas flow bidirectionally.

13. The outer turbine according to claim 1, wherein said outer turbine is arranged to pump said liquid and/or said gas.

14. The outer turbine according to claim 1, wherein said outer envelope and/or at least one of said one or more inner turbine blades are fabricated of a material, wherein at least one said material is selected from the group consisting of metals, metal alloys, superalloys, polymers, ceramics, glass, fiber materials, nanomaterials, binders, heat resistant materials, water resistant materials, solvent resistant materials, chemically resistant materials, layered materials, radiation resistant materials, or combinations thereof.

15. The outer turbine according to claim 1, wherein said outer envelope and/or at least one of said one or more inner turbine blades are provided with a cooling system, wherein at least one said cooling system is selected from liquid cooling systems, air cooling systems, structural cooling systems, or combinations thereof.

16. The outer turbine according to claim 1, wherein said outer turbine is couplable or coupled with another turbine, wherein said other turbine is selected from the group consisting of said outer turbines, radial turbines, axial turbines, concentric turbines, or combinations thereof.

17. The outer turbine according to claim 1, wherein said outer turbine is couplable or coupled with a mechanocomponent, wherein at least one said mechano-component is selected from the group consisting of engines, gear devices, brakes, clutches, turbochargers, superchargers, compressors, transmission means, jets, nozzles, inlet openings, outlet openings, inlet pipes, outlet pipes, thermal management systems, liquid supplies, gas supplies, liquid drainages, gas discharges, water locks, or combinations thereof, wherein at least one said gear device is selected from variators, gear boxes, or combinations thereof, and wherein at least one said transmission mean is selected from the group consisting of belts, chains, cardans, cogwheels, gear wheels, or combinations thereof.

18. The outer turbine according to claim 1, wherein said outer turbine is couplable or coupled with an electro-component, wherein at least one said electro-component is selected from the group consisting of sensors, targets, actuators, amplifiers, resonators, rectifiers, filters, inverters, converters, transformers, voltage regulators, power factor corrections, compensations, power electronics, chargers, controllers, processors, inductors, capacitors, resistors, diodes, varactors, switches, conductors, rechargeable batteries, rechargeable power sources, source management systems, loads, power transfer interfaces, input devices, electric motors, arrays of solar cells, hydrogen power units providing fuel cells, wind energy to electric energy converters, wave energy to electric energy converters, tidal energy to electric energy converters, water currents energy to electric energy converters, thermal energy to electric energy converters, motor generators, electric energy generators, or combinations thereof.

* * * * *